(12) United States Patent
Chen (10) Patent No.: US 7,731,313 B2
(45) Date of Patent: Jun. 8, 2010

(54) LOCATING STRUCTURE FOR SLIDE RAIL

(75) Inventor: Chung Wei Chen, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 864 days.

(21) Appl. No.: 11/507,893

(22) Filed: Aug. 22, 2006

(65) Prior Publication Data

US 2007/0278920 A1   Dec. 6, 2007

(30) Foreign Application Priority Data

Jan. 6, 2006   (TW) ............................... 95200320 U (51) Int. Cl.
*A47B 88/04* (2006.01)
(52) U.S. Cl. .............................. 312/334.45; 312/334.1; 455/575.4
(58) Field of Classification Search ................. 312/333, 312/334.4, 334.44, 334.45, 334.1, 334.7, 312/334.8, 334.46; 384/18, 19, 20, 21, 22; 361/679.3, 679.56; 455/575.1, 575.4, 575.8, 455/90.3
See application file for complete search history.

(56) References Cited

U.S. PATENT DOCUMENTS

| | | | | | |
|---|---|---|---|---|---|
| 1,969,749 | A | * | 8/1934 | Harsh ........................... | 292/73 |
| 2,329,846 | A | * | 9/1943 | Lucas ..................... | 312/334.15 |
| 2,410,701 | A | * | 11/1946 | Zalkind ........................ | 312/261 |
| 2,794,690 | A | * | 6/1957 | Bullock ........................ | 384/18 |
| 3,149,892 | A | * | 9/1964 | Barrow .................... | 312/234.5 |
| 3,186,772 | A | * | 6/1965 | Cohn ........................... | 384/18 |
| 3,205,025 | A | * | 9/1965 | Jordan ......................... | 384/18 |
| 3,904,254 | A | * | 9/1975 | Hagen et al. .................. | 384/18 |
| 4,089,568 | A | * | 5/1978 | Fall .............................. | 384/18 |
| 4,605,265 | A | * | 8/1986 | Bessinger et al. ............. | 384/20 |
| 4,701,058 | A | * | 10/1987 | Mottate ........................ | 384/45 |
| 4,993,847 | A | * | 2/1991 | Hobbs .......................... | 384/21 |
| 5,292,198 | A | * | 3/1994 | Rock et al. .................... | 384/21 |
| 5,316,389 | A | * | 5/1994 | Hoffman ....................... | 384/18 |
| 5,671,988 | A | * | 9/1997 | O'Neill ................... | 312/334.44 |
| 5,868,479 | A | * | 2/1999 | Hoffman ................ | 312/334.44 |

(Continued)

*Primary Examiner*—James O Hansen
(74) *Attorney, Agent, or Firm*—Guice Patents PLLC (57) ABSTRACT

The present invention discloses a locating structure for slide rail, comprising a guide rail which is a rectangular plate disposed with a respective inward-turn slide groove on both sides of its bottom plate, wherein at least two locating holes at the predetermined locating positions are machined to form on the surface of the bottom plate; a slider which is a short frame whose slide plate on top extends to form a respective slide wing on its both sides corresponding to the slide grooves to form a socketingly connection, wherein a respective receiving hole is manufactured to form on both sides of the slide plate, a spring frame, disposed on the bottom of the slide plate and manufactured to form a ball hole on its bottom to socketingly connected with a rolling ball, extends upward an predetermined length from its both sides, respectively, and then bends inward to form a turn portion, respectively, one of which connects downward with a spring plate whose bottom contacts with the rolling ball and the other of which maintains a gap with the spring plate; when the slider slides, the two slide wings slide along the two slide grooves, respectively, and thus the rolling ball compresses the spring plate and moves along the bottom plate until the rolling ball reaches the locating hole to stretch the spring plate, such that the rolling ball falls into the locating hole to form a snapping engagement.

5 Claims, 10 Drawing Sheets

U.S. PATENT DOCUMENTS

| | | | |
|---|---|---|---|
| 6,145,945 A * | 11/2000 | Parvin | 312/334.46 |
| 6,151,485 A * | 11/2000 | Crisp | 455/575.4 |
| 6,378,969 B1 * | 4/2002 | Ferrari et al. | 312/334.44 |
| 6,764,149 B2 * | 7/2004 | Jurja | 312/333 |
| 6,782,242 B1 * | 8/2004 | Koleda et al. | 455/90.3 |
| 6,820,953 B2 * | 11/2004 | Wojcik | 312/332.1 |
| 6,824,233 B2 * | 11/2004 | Chen et al. | 312/334.46 |
| 6,854,817 B1 * | 2/2005 | Simon | 312/334.6 |
| 6,918,700 B2 * | 7/2005 | Chen | 384/49 |
| 6,968,161 B2 * | 11/2005 | Inomata et al. | 455/90.3 |
| 2004/0047678 A1 * | 3/2004 | Lauchner | 403/322.2 |
| 2004/0145285 A1 * | 7/2004 | Hwang et al. | 312/333 |
| 2005/0062378 A1 * | 3/2005 | Wojcik | 312/332.1 |
| 2005/0136698 A1 * | 6/2005 | Kwon | 439/38 |

\* cited by examiner

LOCATING STRUCTURE FOR SLIDE RAIL

FIELD OF THE INVENTION

The present invention relates to a slide rail and in particular to a locating structure for slide rail in which a spring is replaced with an elastic spring frame with the characteristic of storing and releasing energy.

BACKGROUND OF THE INVENTION

A drawer is an object that uses a locating structure for slide rail to replace the flip top structure. Two components can then be moved to the overlaying or extending position. Mobile phone, for example, has a flip top structure, i.e. a cover may be flipped open or close relative to the body through a rotating shaft or a hinge.

Consequently, related industries after numerous developments have successfully applied the slide structure on objects with a cover, mobile phone for example, to enable its upper cover to slide overlaying the body and thus shield the operation panel to be in a close mode. Alternatively, when the upper cover slides to extend and thus reveal the operation panel to be in an operating mode. Certainly, it is possible to have a close mode when extending and an operation mode when overlaying.

Take the slide rail used in current flip cover mobile phones for example; the slide rail is a U-shape bottom plate with a respective locating hole on its opposing side walls. Both ends of the bottom plate are machined to form a start hole and an final hole, respectively. A cast slider is disposed on the bottom plate whose center is protrudingly disposed with a protruding rod which is machined to form a spring groove on its bottom. A spring is disposed into the spring groove whose entry is connected with a steel ball such that the steel ball may move freely in the spring groove. Furthermore, the protruding rod is disposed with a connecting rod for screws on its respective side to connect with the cover. The other opposite U-shape top cover covers the bottom plate such that the respective protruding fasten tenon on both sides are snappingly engaged with their snapping holes. The long slide groove on the top provides the out extending of the three prisms of the slider part to limit the slide motion. In addition, a friction plate is disposed between the bottom surface of the slider and the bottom plate. Consequently, the slider may move along the slide groove to render the steel ball compressing the spring and rolling on the bottom plate, such that when the steel ball reaches the start or final hole, the steel ball is snappingly engaged into the holes for locating as a result of spring stretching.

Although the aforementioned slide rail may have a locating function, its drawback includes the slider is formed by casting, which is characterized by lack of precision. Furthermore, the dimension of the slider part is rather small and thus the spring is very fine and delicate, such that the assembling of the spring and steel ball is complicated and difficult. In addition, the slider rail comprises a bottom plate and a top cover, leading to an enhanced manufacturing cost and complicated assembling process. Consequently, it is necessary to design a new slide rail to overcome the shortcomings described above.

SUMMARY OF THE INVENTION

To meet such a demand, the applicant having experience in designing and production of the rotating shaft invented the present invention, locating structure for slide rail, as a result of numerous trials and experiments.

To achieve the aforementioned object, the present invention provides a locating structure for slide rail, comprising a guide rail which is a rectangular plate disposed with a respective inward-turn slide groove on both sides of its bottom plate, wherein at least two locating holes at the predetermined locating positions are machined to form on the surface of the bottom plate; a slider which is a short frame whose slide plate on top extends to form a respective slide wing on its both sides corresponding to the slide grooves to form a socketingly connection, wherein a respective receiving hole is manufactured to form on both sides of the slide plate, a spring frame, disposed on the bottom of the slide plate and manufactured to form a ball hole on its bottom to socketingly connected with a rolling ball, extends upward an predetermined length from its both sides, respectively, and then bends inward to form a turn portion, respectively, one of which connects downward with a spring plate whose bottom contacts with the rolling ball and the other of which maintains a gap with the spring plate; when the slider slides, the two slide wings slide along the two slide grooves, respectively, and thus the rolling ball compresses the spring plate and moves along the bottom plate until the rolling ball reaches the locating hole to stretch the spring plate, such that the rolling ball falls into the locating hole to form a snapping engagement.

Another object of the present invention is to provide a locating structure for slide rail, comprising a guide rail which is a rectangular plate disposed with a respective inward-turn slide groove on both sides of its bottom plate, wherein at least two locating holes at the predetermined locating positions are machined to form on the surface of the bottom plate; a slider which is a short frame whose slide plate on top extends to form a respective slide wing on its both sides corresponding to the slide grooves to form a socketingly connection, wherein a respective receiving hole is disposed on both sides of the slide plate and an arch spring frame is disposed on the bottom of the slide plate and protrudingly provided with a protruding point; when the slider slides, the two slide wings slide along the two slide grooves and thus the protruding point compresses the spring frame and moves along the bottom plate until the protruding point reaches the locating hole to stretch the spring frame, such that the protruding point falls into the locating hole to form a snapping engagement.

Yet another object of the present invention is to provide a locating structure for slide rail, wherein both ends of the guide rail are disposed with a stop plate and a tongue plate, respectively, and the top edge of the stop plate extends sideways to form an embedded plate and the tongue plate is machined to form a plate hole. Furthermore, the receiving hole is a screw hole.

Still yet another object of the present invention is to provide a locating structure for slide rail, further comprising a friction plate which is a arch plate whose respective ends are disposed with a connecting plate to be connected with the slide wing to form a linking motion and whose lower arch friction portion corresponding to the rolling ball or protruding point is machined to form a plate groove for the passing through of the rolling ball or protruding point.

BRIEF DESCRIPTION OF THE DRAWINGS

The present invention can be more fully understood by reference to the following description and accompanying drawings, in which.

DETAILED DESCRIPTION OF THE INVENTION

Referring to FIGS. 1a to 4b, a slide rail according to the present invention comprises a guide rail 1 and a slider 2.

Figure 1A:
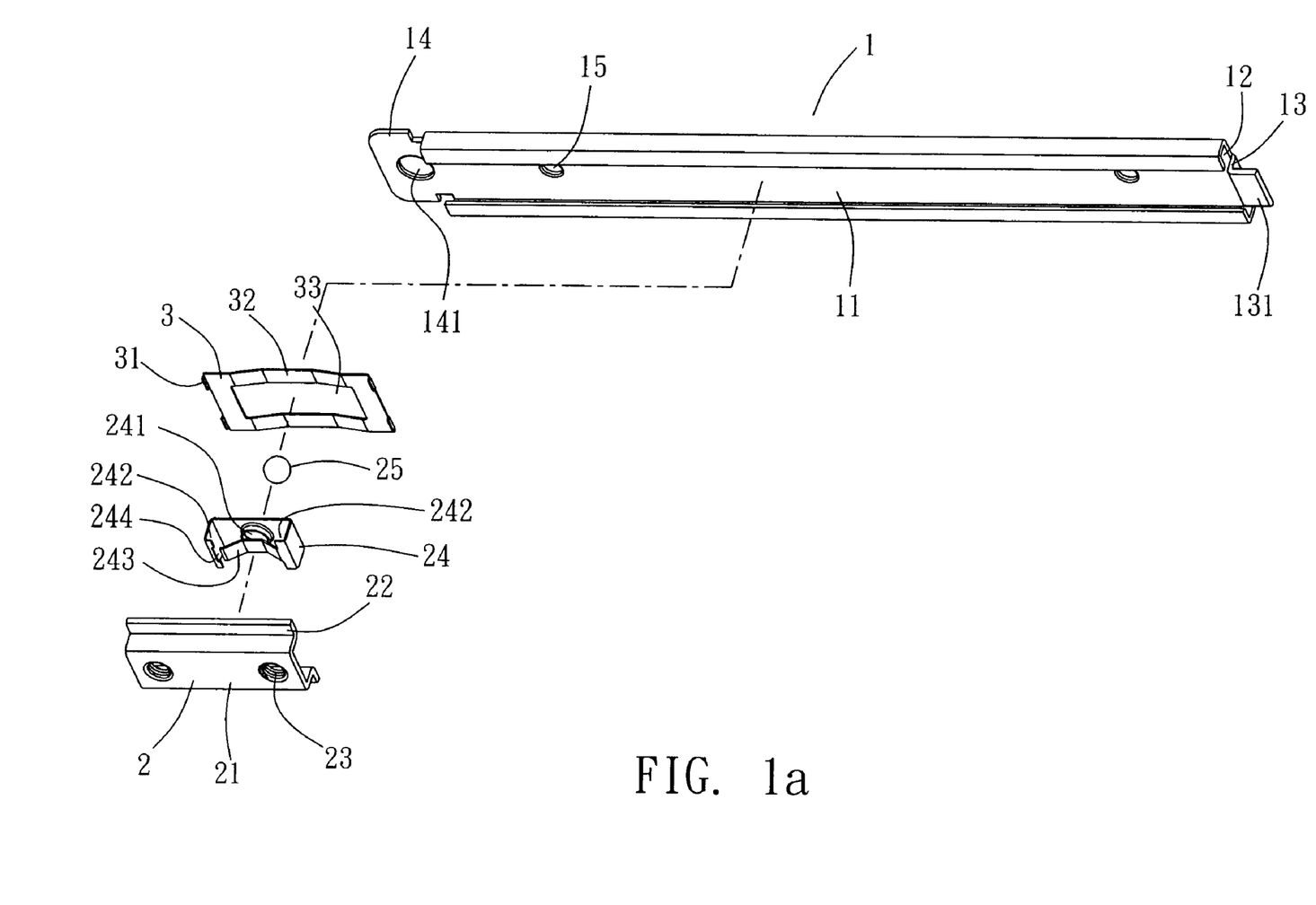
FIGS. 1a and 1b schematically illustrate the exploded perspective view of the slide rail along two different view angles according to the present invention.
Figure 1B:
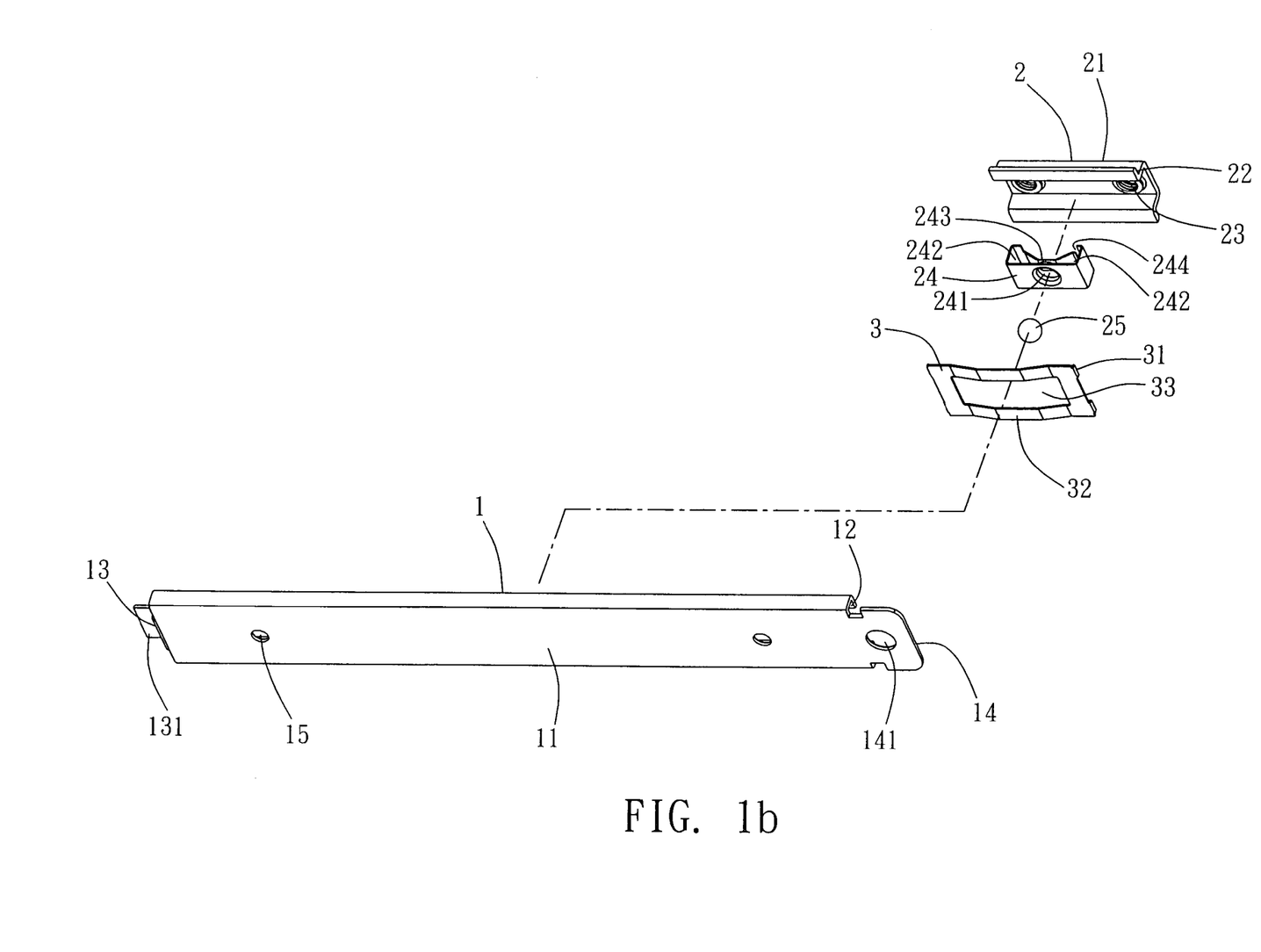

The guide rail 1 which is a rectangular plate whose bottom plate 11 is disposed with a respective inward-turn slide groove 12 on both sides and whose two ends are protrudingly disposed with a stop plate 13 and a tongue plate 14, respectively, wherein the top edge of the stop plate 13 extends sideways to form an embedded plate 131 and the tongue plate 14 is machined to form a plate hole 141 to insertingly engage or fasten with an object, the body for example. Furthermore, the bottom plate 11 are manufactured to form two locating holes 15 corresponding to the initial and final positions.

The slider 2 which is a short frame whose slide plate 21 on top extends to form a respective slide wing 22 on its both sides corresponding to the slide grooves 12 and whose two respective ends are opposingly disposed a receiving hole 23, screw hole for example, to connect with an object, cover for example, by a conventional faster, screw for example.

The present invention is characterised by that the bottom of the slide pate 21 disposed with a spring frame 24 which is formed by bending a metal plate into a U-shape whose bottom disposed with a ball hole 241 to be socketingly connected with a rolling ball 25 and whose both sides extend upward an predetermined length, respectively, and then bends inward to form a turn portion, respectively 242, one of which connects downward with an arch spring plate 243 whose bottom contacts with the rolling ball 25 and the other of which maintains a gap 244 with the spring plate 243. Under normal conditions, the rolling ball 25 compresses the spring plate 243 to cross the gap 244 and to press against the adjoining turn portion 242, such that the rolling ball 25 is prevented from falling into the interior of the spring frame 24. Alternatively, when the rolling ball 25 rolls along the bottom plate 11 toward the locating hole 15, the spring plate 243 stretches to render the rolling ball 25 falling into the locating hole 15 to form a snappingly engagement.

Furthermore, the bottom of the slide plate 21 is further disposed with a friction plate 3 which is an arch plate whose respective ends are protrudingly disposed with a connecting plate 31 to be connected with the slide wing 22 so as to move freely along with the slider 2 and whose lower arch friction portion 32 corresponding to the rolling ball 25 is machined to form a plate groove 33 for the passing through of the rolling ball 25. The advantage of the friction plate 3 is that it may compensate the tolerance between the slide groove 12 and the slide wing 22, such that the slider 2 may not vibrate when sliding and thus the toughness and wear resistance of the slider may be enhanced, leading to a longer service life.

Figure 2:
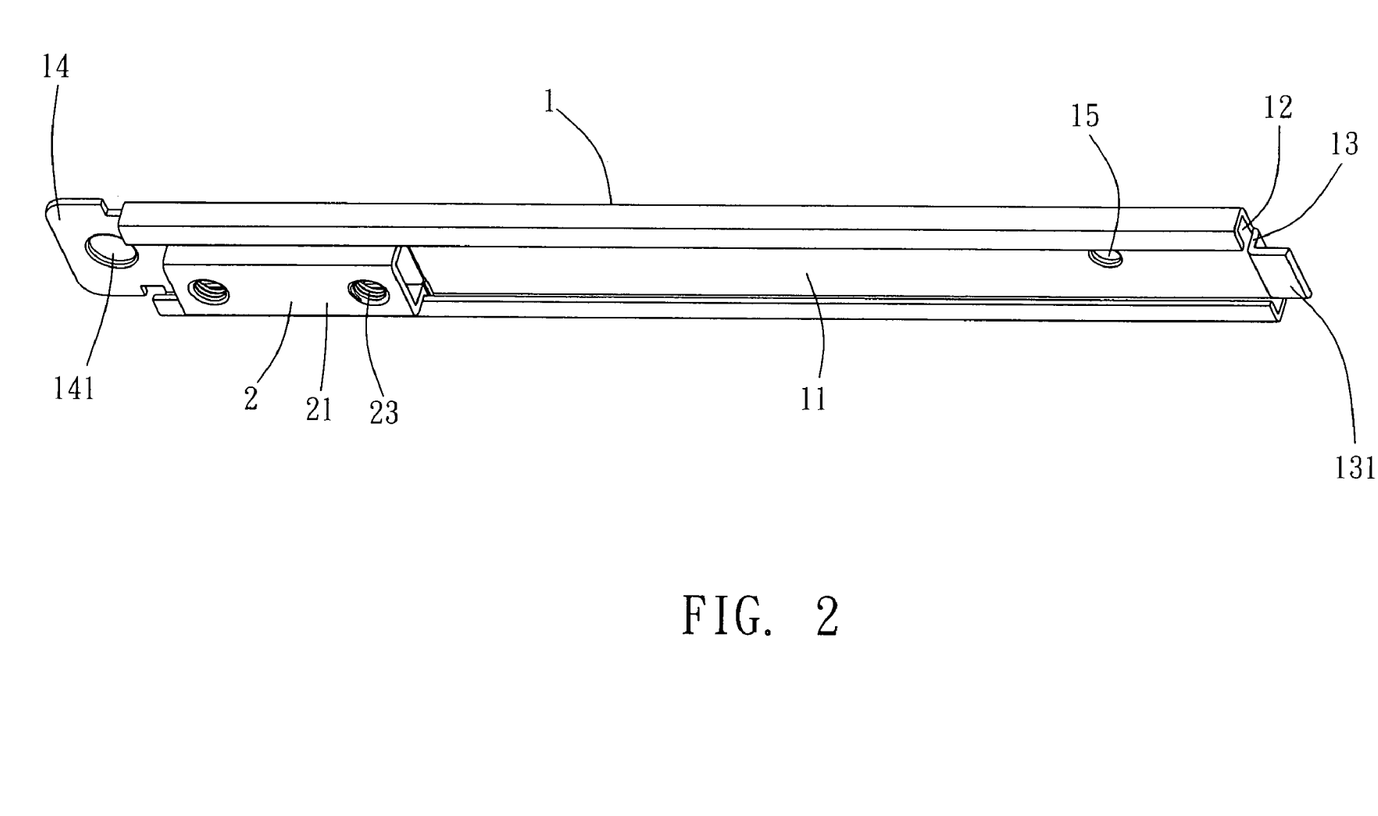
FIG. 2 schematically illustrates the perspective assembly view of the slide rail before being operated according to the present invention.
Figure 3:
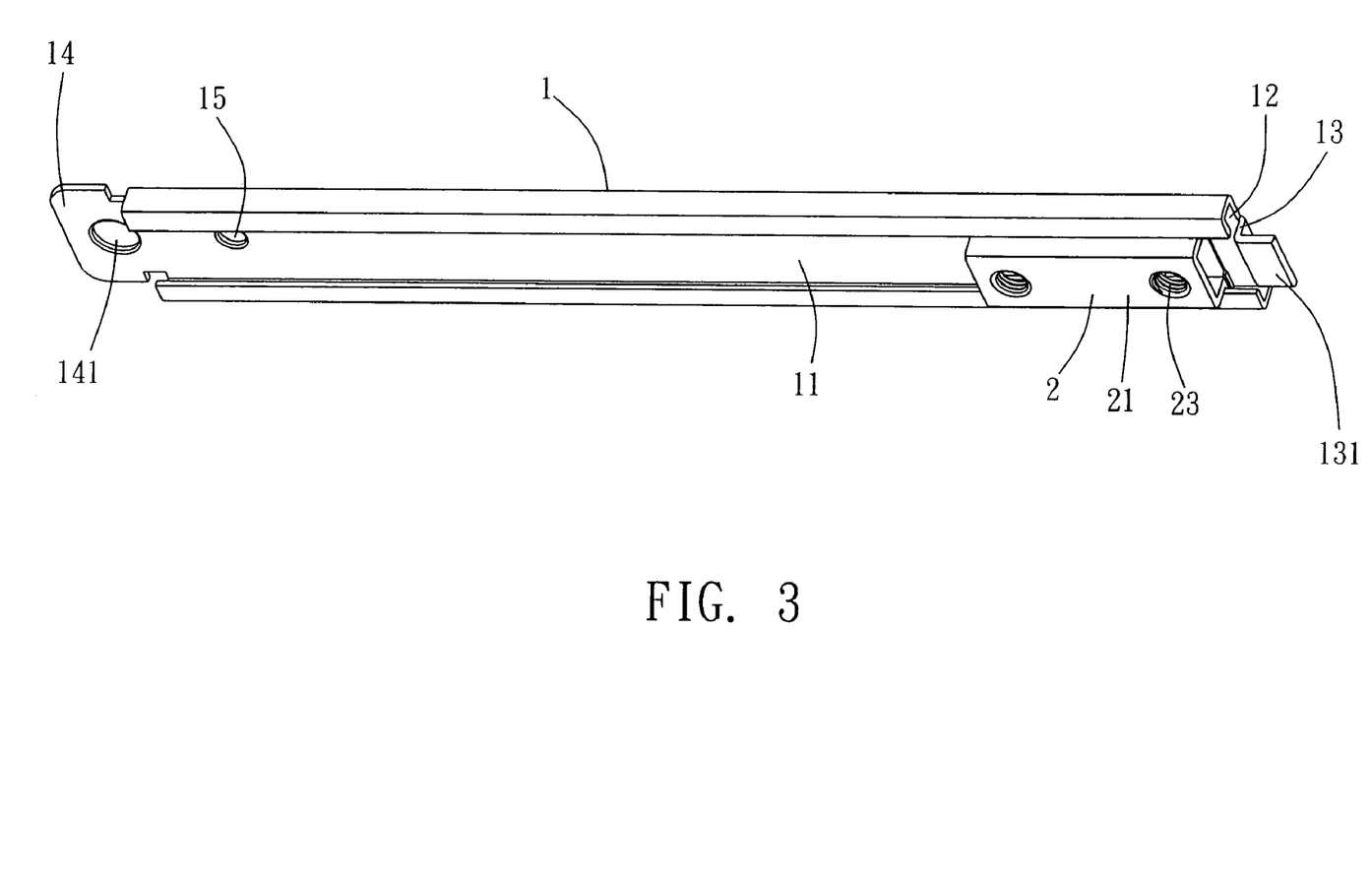
FIG. 3 schematically illustrates the perspective view of the slide rail sliding to the final locating hole according to the present invention.
Figure 4A:
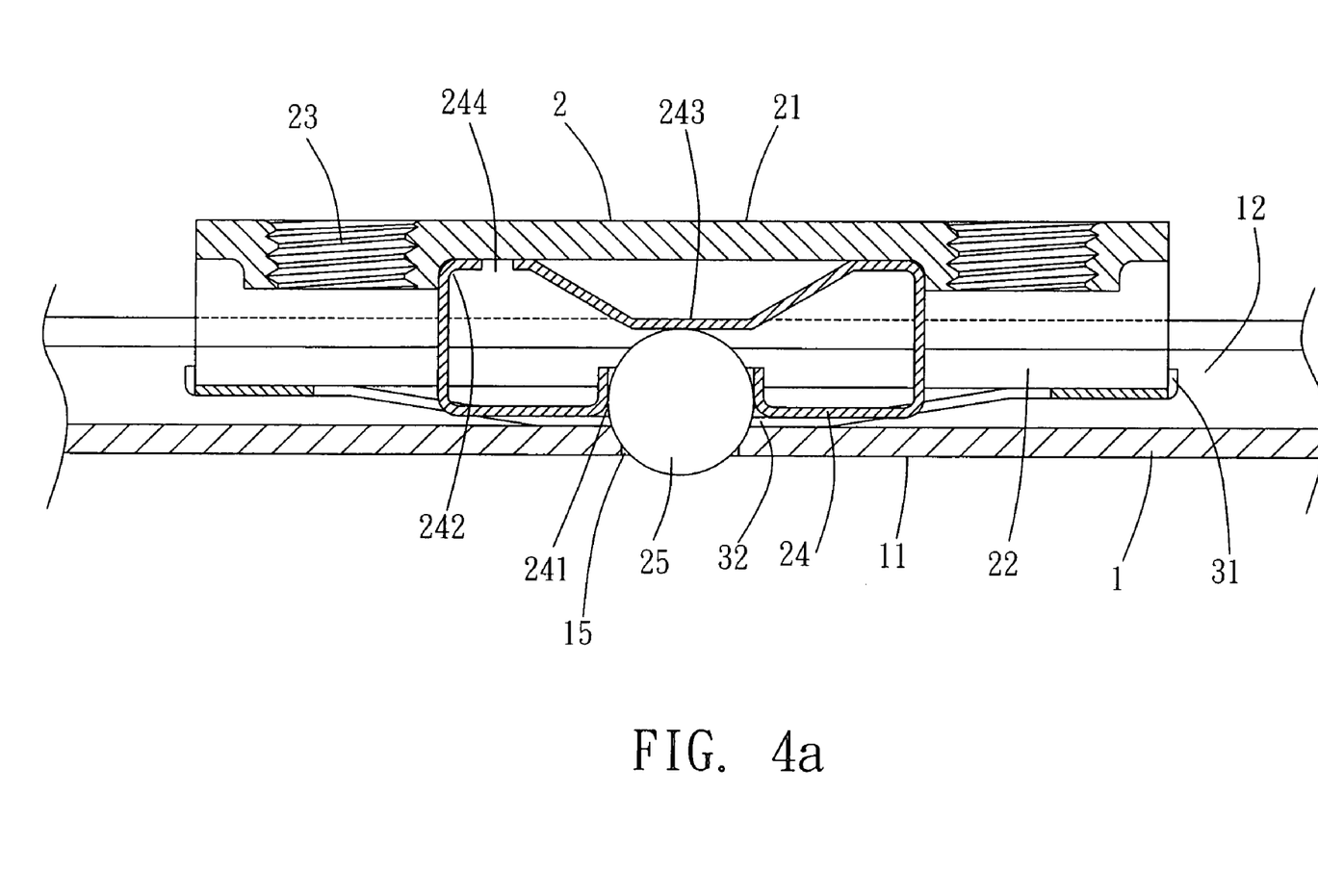
FIGS. 4a and 4b schematically illustrate cross-sectional views of the slide rail sliding to locating state according to the present invention.
Figure 4B:
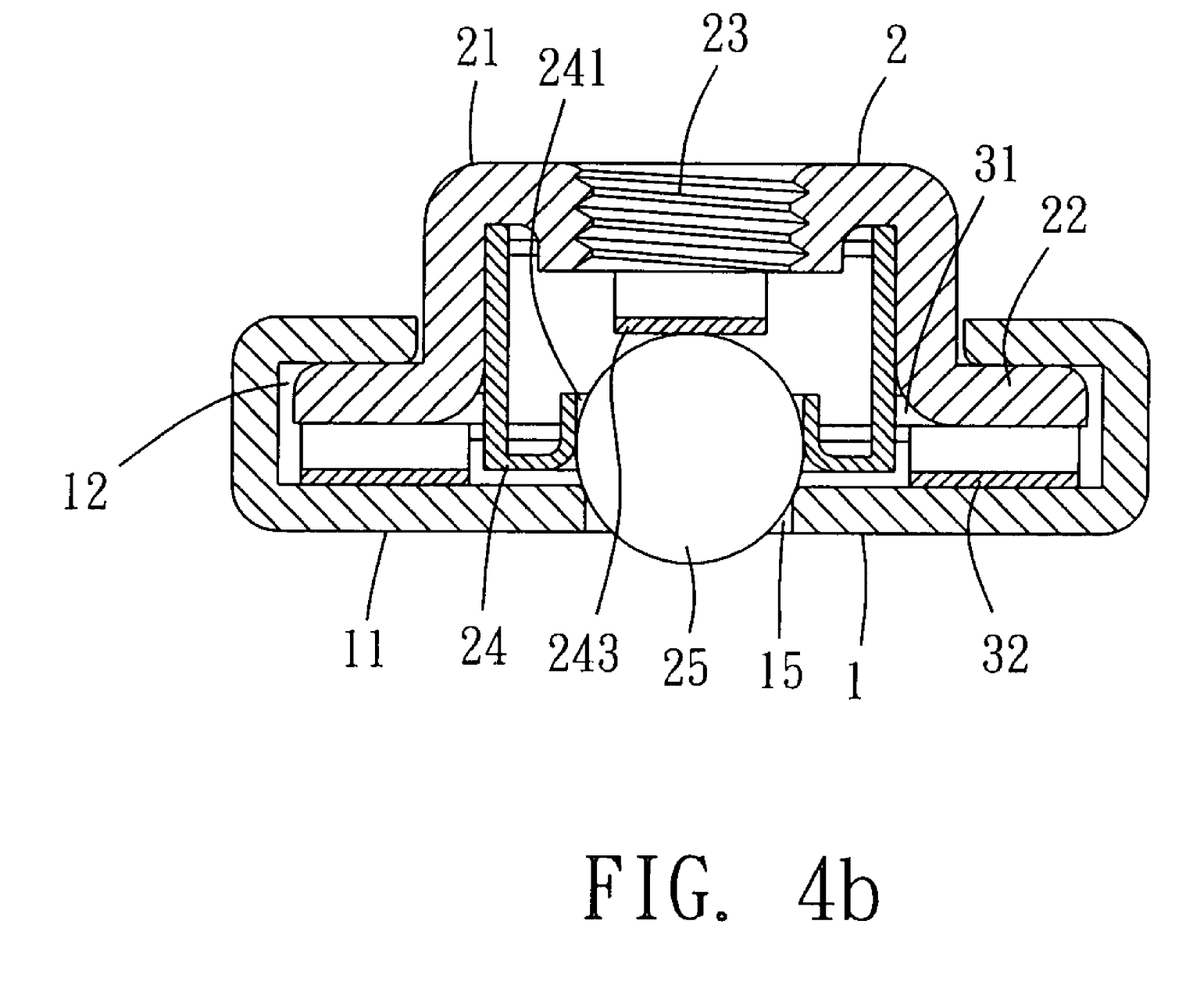
Figure 5A:
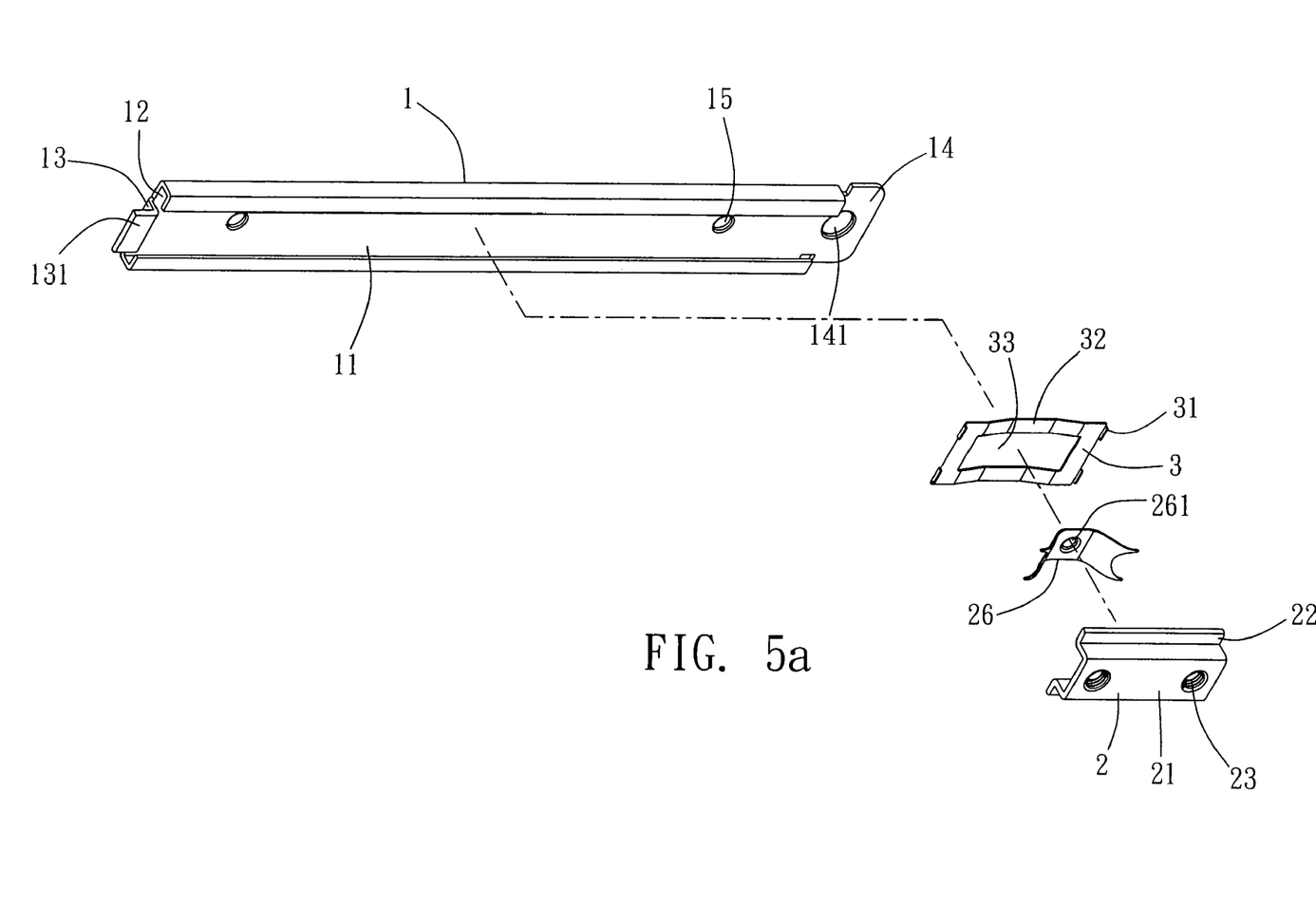
FIGS. 5a and 5b schematically illustrate exploded perspective views of another embodiment of the slide rail along two different view angles according to the present invention.
Figure 5B:
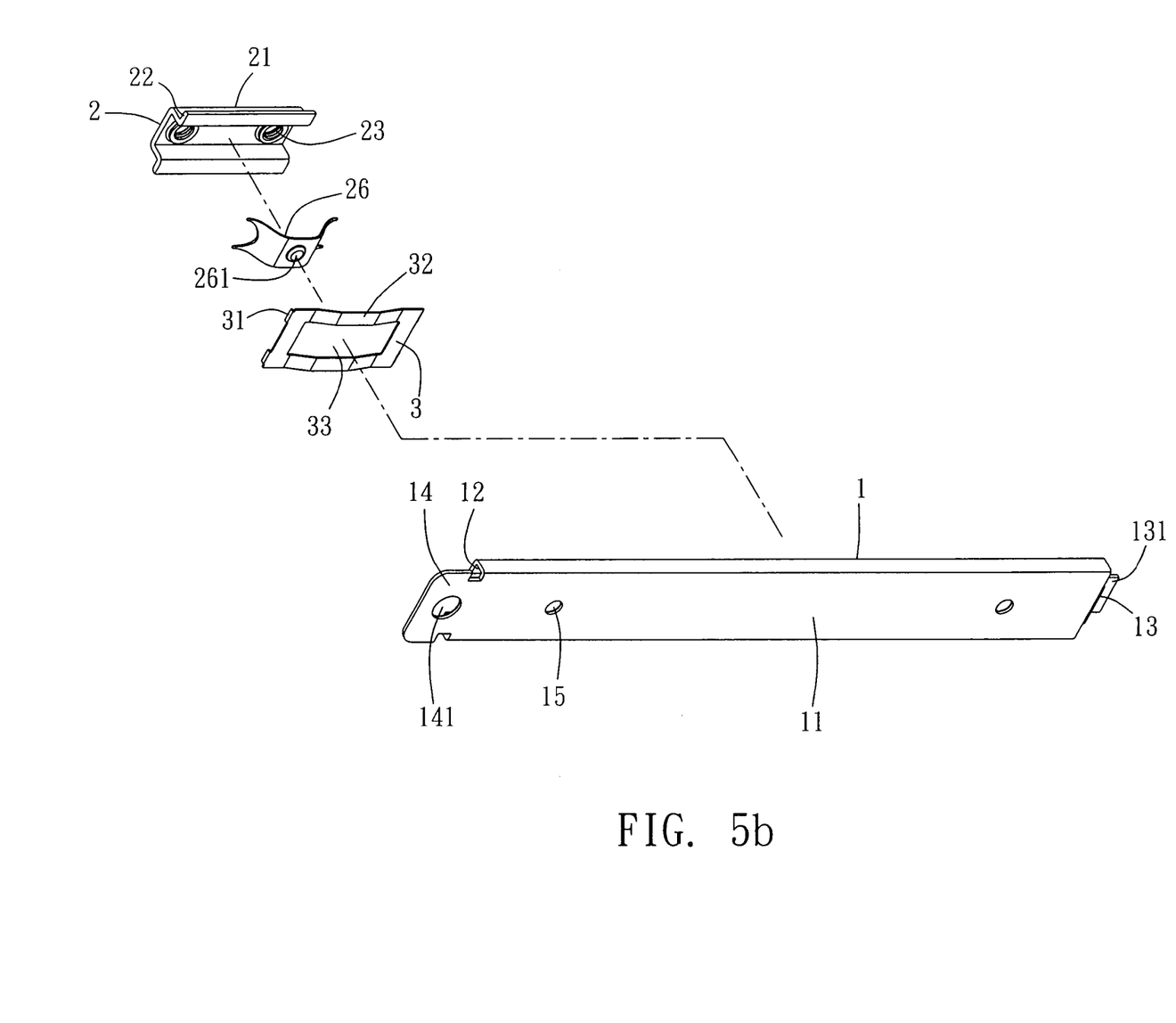
Figure 6A:
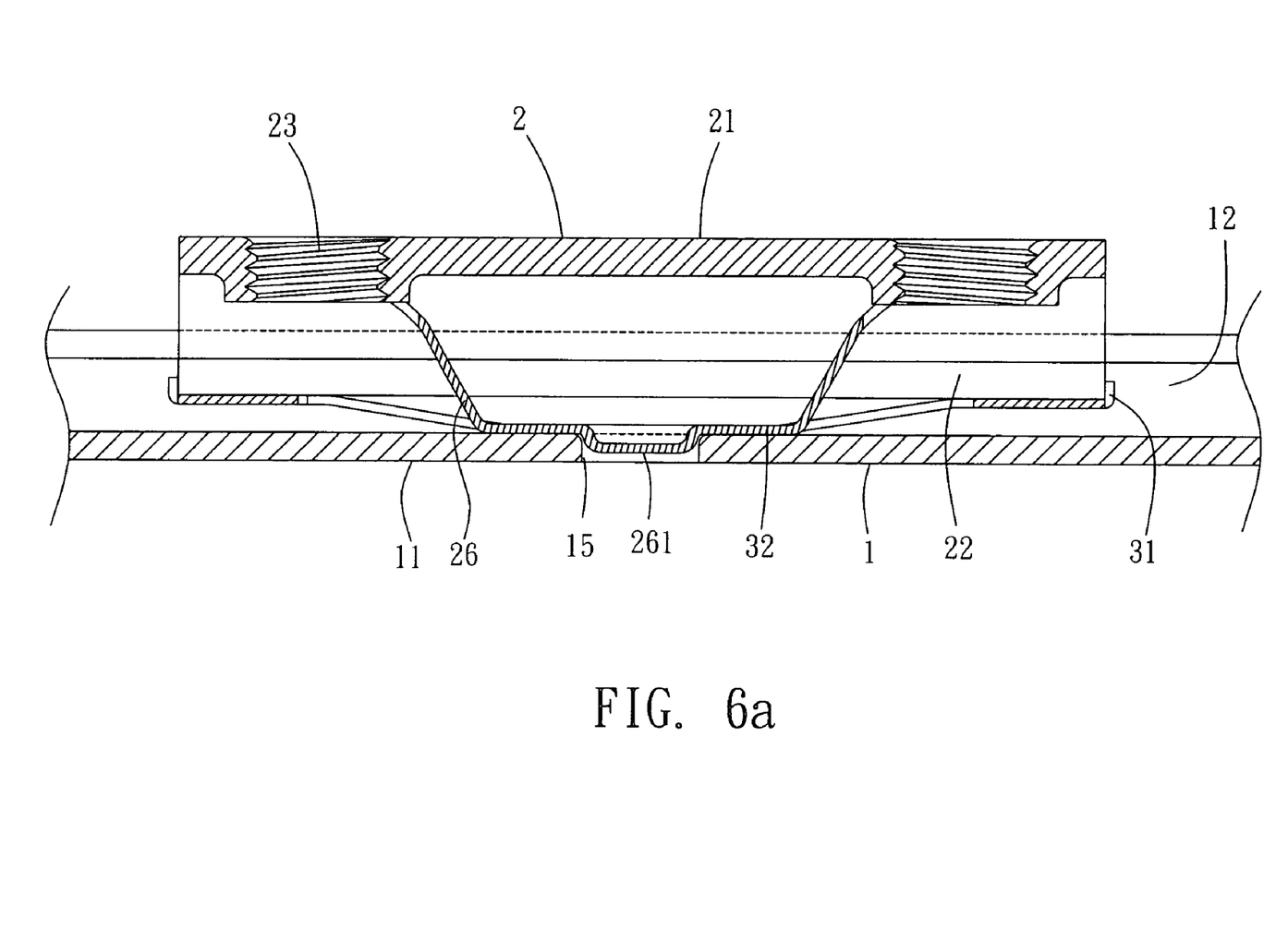
FIGS. 6a and 6b schematically illustrate cross-sectional views of another embodiment of the slide rail sliding to locating state according to the present invention.
Figure 6B:
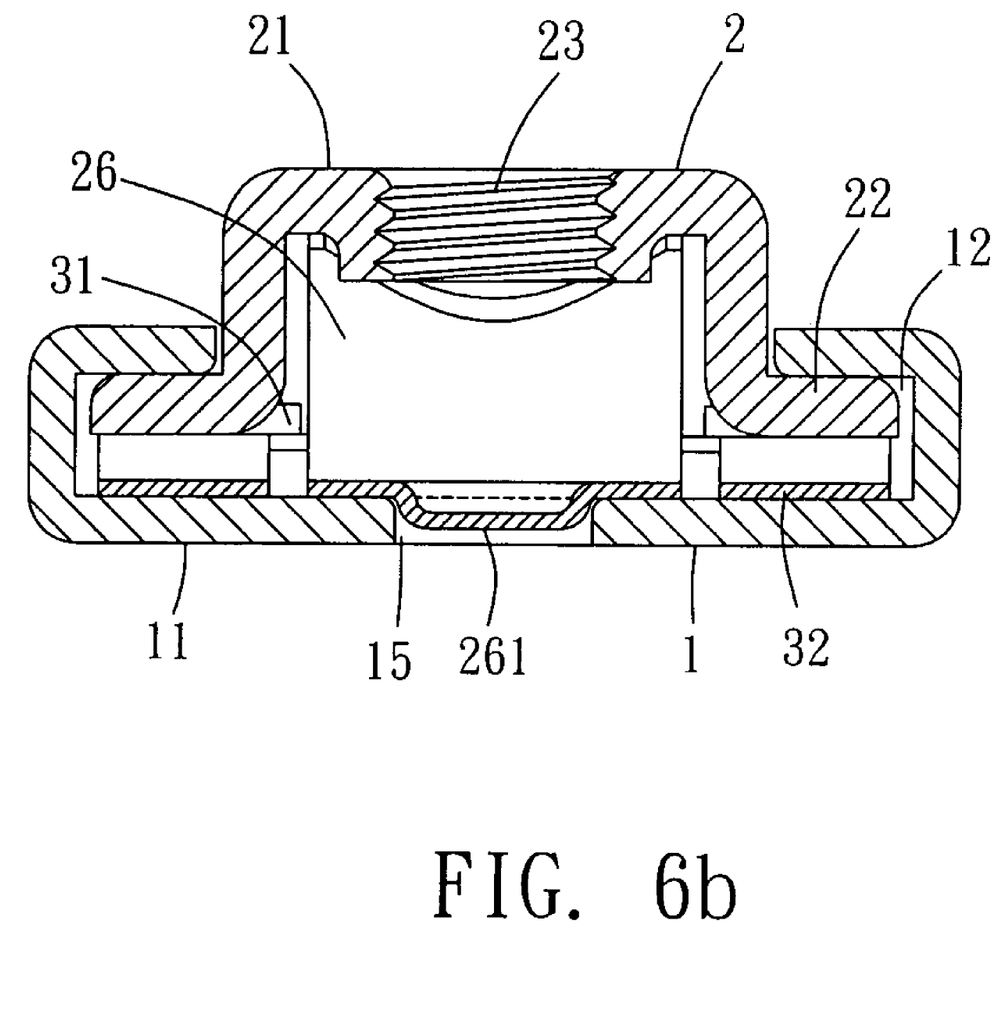

FIGS. 2 and 3 show the present invention after being assembled. When the present invention is being operated, an external force is applied to move the slider 2 with its both slide wing 22 sliding along the two slide grooves 12 of the guide rail 1. In the mean time, the rolling ball 25 and the arch friction portion 32 moves along the bottom plate 11 until the rolling ball 25 falls into the final locating hole 15 shown in FIG. 3, such that the cover is now an open condition relative to the body, i.e. the operating condition. Alternatively, an reverse force is applied to the slider 2 to render the rolling ball 25 falling into the initial locating hole 15 to enter the close condition.

FIGS. 5a, 5b, 6a and 6b show another embodiment of the slide rail according to the present invention, wherein the guide rail 1 and the friction plate 3 are identical to those of the aforementioned embodiment and thus will not discussed furthermore. The present embodiment differs from the aforementioned one in that the elastic spring frame 26 is an arch shape and is disposed between two receiving holes 23 on the bottom of the slider 2. The bottom of the spring frame 26 is protrudingly provided with a protruding point 261 to replace the rolling ball and move along the bottom plate 11. When the protruding point 261 falls into any one of the two locating holes 15, the spring frame 26 may release energy to form a snapping engagement and thus provide locating function.

By putting the present invention into practice, an elastic spring frame replaces a conventional spring; the practice may bypass the difficulties in manufacturing and assembling of the fine, delicate spring. The slider of the present invention may be manufactured by bending a plate, which may obtain a better precision compared with its casting counterpart. In addition, the guide rail of the present invention may be integrally bend to form, not a slide rail formed by two pieces connected together, leading to a substantial cost down and reduced assembling process. Furthermore, the friction plate of the present invention may compensate the tolerance between the slide groove and the slide wing, such that the slider may not vibrate when sliding and thus the toughness and wear resistance of the slider may be enhanced, leading to a longer service life.

While the invention has been described with reference to the a preferred embodiment thereof, it is to be understood that modifications or variations may be easily made without departing from the spirit of this invention, which is defined by the appended claims.

What is claimed is:

1. A locating structure for slide rail comprising:
   a guide rail being a rectangular plate and having two inward-turn slide grooves, a bottom plate, and at least two locating holes, one of the two inward-turn slide grooves is located on each of two opposing sides of the bottom plate, the at least two locating holes are spaced apart at predetermined locating positions on the bottom plate;
   a slider being a frame and having a slide plate having two slide wings extending from opposite sides thereof, one of the two slide wings being slidably inserted into a corresponding one of the two inward-turn slide grooves, the slide plate has two respective receiving holes located on opposing ends thereof, a spring frame located on a bottom of the slide plate and having a ball hole located on a bottom thereof, a rolling ball inserted into the ball hole, the spring frame extending upwardly a predetermined length on each of two opposing sides thereof, respectively, and then bending inwardly forming two turn portions, one of the two turn portions is located on each of the two opposing sides of the spring frame, a first turn portion of the two turn portions of the spring frame is connected with a spring plate, a second turn portion of the two turn portions of the spring frame is spaced apart from the spring plate forming a gap there between, a bottom of the spring frame engaging the rolling ball;

wherein, when the slider slides, the two slide wings slide along the two slide grooves, respectively, and the rolling ball compressing the spring plate and moving along the bottom plate until the rolling ball reaches a corresponding one of the at least two locating holes, wherein, when the rolling ball reaches one of the at least two locating holes, the spring plate pressing the rolling ball into the corresponding one of the at least two locating holes;

wherein the spring plate is a metal plate having a U-shape.

2. The device as defined claim 1, wherein the guide rail has a stop plate located on a first end thereof and a tongue plate located on a second end thereof, and a top edge of the stop plate extending outwardly and forming an embedded plate and the tongue plate has a plate hole.

3. The device as defined claim 1, wherein the receiving hole is a screw hole.

4. The device as defined claim 1, wherein the rolling ball is located in the ball hole of the spring frame and positioned between the bottom plate of the guide rail and the slide plate of the slider and the spring plate pressing the rolling ball against the bottom plate of the guide rail.

5. The device as defined claim 1, further comprising a friction plate being an arch plate having opposing ends connected to the two slide wings of the connecting plate and a lower arch friction portion having a plate groove, the rolling ball extending through the plate groove.

* * * * *